Patented Dec. 30, 1930

1,786,623

UNITED STATES PATENT OFFICE

HANS LEHRECKE, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF DELAWARE

WARNING MEANS FOR POISON GASES

No Drawing. Application filed June 24, 1926, Serial No. 118,378, and in Austria July 18, 1925.

The object of this invention is to provide a means for giving warning of the presence of toxic vapors or gases which in themselves are without noticeable odor or other warning action on the eyes or nose of humans. The extreme cases of the non-warning toxic gases are carbon monoxide and hydrocyanic acid.

Previous use has been made of such highly volatile substances as cyanogen chloride or bromide, other materials of higher boiling point have been tried but their warning action is insufficient.

I have now discovered that chloropicrin forms a warning agent of exceptional value. Its high boiling point insures its slow vaporization; its vaporization is sufficiently rapid when admixed with toxic gas or when sprayed by itself into toxic atmosphere. Its peculiar suffocating odor makes it impossible to remain comfortable in its vicinity. Finally, unlike cyanogen chloride etc. it is not highly toxic nor excessively lachrymatory. The lachrymating effect of the cyanogen chloride is so great that operatives exposed to the toxic mixture can become so blinded as to be unable to move quickly out of the poisonous area.

The chloropicrin may in some cases be admixed with a small amount of a mild lachrymatory substance such as bromobenzene and an additional warning means. The chloropicrin may be sprayed or otherwise released in the room or area to be treated before, after or simultaneously with the hydrocyanic acid. Both these substances may be mixed in liquid form and absorbed in porous substances such as active charcoal, kieselguhr, or the like or they may be thus absorbed individually.

Suitable concentrations of chloropicrin for various uses are not definite but the following examples illustrate its use.

(1) A liquid mixture of 10% chloropicrin and 90% hydrocyanic acid is suitable for absorbing in active charcoal, kieselguhr and the like. The hydrocyanic acid and chloropicrin are evolved simultaneously from this mass when employed as usual for absorbed fumigants.

(2) For fumigation mechanical spraying of hydrocyanic acid 5% of chloropicrin in the hydrocyanic acid is suitable.

I do not, however, wish to be limited to any of the above concentrations or methods of fumigation.

What I claim is:

1. Method of fumigation which comprises employing vapors of hydrocyanic acid having sufficient chloropicrin vapors admixed therewith to act as a warning agent.

2. A composition of matter comprising a liquid mixture of 90-95% hydrocyanic acid and chloropicrin 5 to 10%.

3. A fumigant comprising 90-95% hydrocyanic acid and 5-10% chloropicrin.

4. A composition of matter comprising kieselguhr having absorbed therein a fumigant comprising 90-95% hydrocyanic acid and 5-10% chloropicrin.

5. A composition of matter for fumigating, comprising hydrocyanic acid and chloropicrin in such proportion as to constitute when vaporized a warning of a toxic concentration of hydrocyanic acid.

6. A composition of matter comprising hydrocyanic acid and chloropicrin absorbed in inert absorbent material, the chloropicrin being in such proportion that when the mixture is vaporized a warning of a toxic concentration of hydrocyanic acid will be given.

7. A fumigant comprising hydrocyanic acid and sufficient chloropicrin admixed therewith to act as a warning gas.

Signed at Frankfort-on-the-Main, Germany, this 9th day of June A. D. 1926.

HANS LEHRECKE.